US012696871B2

(12) United States Patent
Dippold et al.

(10) Patent No.: US 12,696,871 B2
(45) Date of Patent: Aug. 4, 2026

(54) TEMPERATURE-CONTROLLED AUTOMATIC WET PET FOOD FEEDER ASSEMBLY

(71) Applicant: Feinkind Inc., Austin, TX (US)

(72) Inventors: Elizabeth Dippold, Fort Lauderdale, FL (US); Joshua Feinkind, Sherman Oaks, CA (US)

(73) Assignee: Feinkind Inc., Austin, TX (US)

( * ) Notice: Subject to any disclaimer, the term of this patent is extended or adjusted under 35 U.S.C. 154(b) by 0 days.

(21) Appl. No.: 19/479,185

(22) PCT Filed: Apr. 22, 2024

(86) PCT No.: PCT/US2024/025702
§ 371 (c)(1),
(2) Date: Oct. 27, 2025

(87) PCT Pub. No.: WO2024/220989
PCT Pub. Date: Oct. 24, 2024

(65) Prior Publication Data
US 2026/0090516 A1    Apr. 2, 2026

Related U.S. Application Data

(60) Provisional application No. 63/461,142, filed on Apr. 21, 2023.

(51) Int. Cl.
*A01K 5/02* (2006.01)

(52) U.S. Cl.
CPC ............ *A01K 5/0291* (2013.01); *A01K 5/025* (2013.01); *A01K 5/0283* (2013.01)

(58) Field of Classification Search
CPC .... A01K 5/0291; A01K 5/0283; A01K 5/025; A01K 5/0275; A01K 29/00
See application file for complete search history.

(56) References Cited

U.S. PATENT DOCUMENTS 3,826,231 A    7/1974    Crawford et al.
4,450,790 A    5/1984    Stansbury
(Continued)

FOREIGN PATENT DOCUMENTS

KR    20200088176 A  *  7/2020    ........... A01K 29/005
WO    1992003042 A1    3/1992
(Continued)

*Primary Examiner* — Peter M Poon
*Assistant Examiner* — Shada Mohamed Alghailani
(74) *Attorney, Agent, or Firm* — Mark C. Johnson; Johnson |Dalal

(57)    ABSTRACT

A temperature-controlled automatic wet pet food feeder assembly that includes a portable housing having a plurality of feeding compartments operable to store wet pet food, preferably in a longitudinally oriented direction. The assembly includes a refrigeration unit operable to cool one or more of the feeding compartments with the wet pet food within a range of approximately 30-45° F. and, when desired by the user, warm up the wet pet food in one or more of the feeding compartments. When the wet pet food is warmed, the assembly will cause one or more of the ready compartments to have its cover be removed for access by the pet to feed. Once the pet is finished feeding, which may be detected with a weight scale, the assembly will automatically close the cover.

13 Claims, 11 Drawing Sheets

(56)　　　　References Cited

U.S. PATENT DOCUMENTS

| | | | |
|---|---|---|---|
| 4,501,229 | A | 2/1985 | Williamson |
| 4,671,210 | A | 6/1987 | Robinson et al. |
| 4,805,560 | A | 2/1989 | Knego et al. |
| 4,981,106 | A | 1/1991 | Nagatomo |
| 5,222,461 | A | 6/1993 | Haynes |
| 5,377,620 | A | 1/1995 | Phillippi |
| 6,349,671 | B1 | 2/2002 | Lewis et al. |
| 6,363,886 | B1 | 4/2002 | Statton |
| 6,766,766 | B1 | 7/2004 | Elliott |
| 7,263,953 | B2 | 9/2007 | Sundararajan |
| 7,650,855 | B2 | 1/2010 | Krishnamurthy |
| 7,685,966 | B2 | 3/2010 | Goehring |
| 7,832,355 | B2 | 11/2010 | Mills |
| 8,800,488 | B2 | 8/2014 | Stone |
| 9,232,769 | B1 | 1/2016 | Wolf et al. |
| 9,332,729 | B1 * | 5/2016 | Hyle .................... A01K 5/0142 |
| 9,560,834 | B2 | 2/2017 | Ma |
| 10,568,301 | B2 | 2/2020 | Chen |
| 12,127,534 | B1 * | 10/2024 | Quick ................. A01K 5/0291 |

| | | | |
|---|---|---|---|
| 2005/0066905 | A1 | 3/2005 | Morosin et al. |
| 2006/0032451 | A1 | 2/2006 | Gonet |
| 2008/0105205 | A1 * | 5/2008 | Goehring ............. A01K 5/0114 119/51.02 |
| 2015/0040832 | A1 * | 2/2015 | Klein ..................... A01K 5/025 119/51.11 |
| 2015/0053138 | A1 * | 2/2015 | Ramsey ............... B65B 59/003 119/61.5 |
| 2015/0342144 | A1 * | 12/2015 | Palmatier ............ A01K 5/0291 119/51.11 |
| 2016/0007565 | A1 | 1/2016 | Trottier et al. |
| 2017/0035025 | A1 * | 2/2017 | Oates .................. A01K 5/0275 |
| 2019/0029221 | A1 | 1/2019 | Anderton |
| 2021/0144960 | A1 * | 5/2021 | Taneja ................... A01K 7/027 |
| 2024/0268342 | A1 * | 8/2024 | Seyfi ....................... F25B 21/04 |

FOREIGN PATENT DOCUMENTS

| | | | |
|---|---|---|---|
| WO | 2011110822 | A2 | 9/2011 |
| WO | 2015166301 | A1 | 11/2015 |
| WO | WO-2017185053 | A1 * | 10/2017 ........... A01K 5/0225 |

* cited by examiner

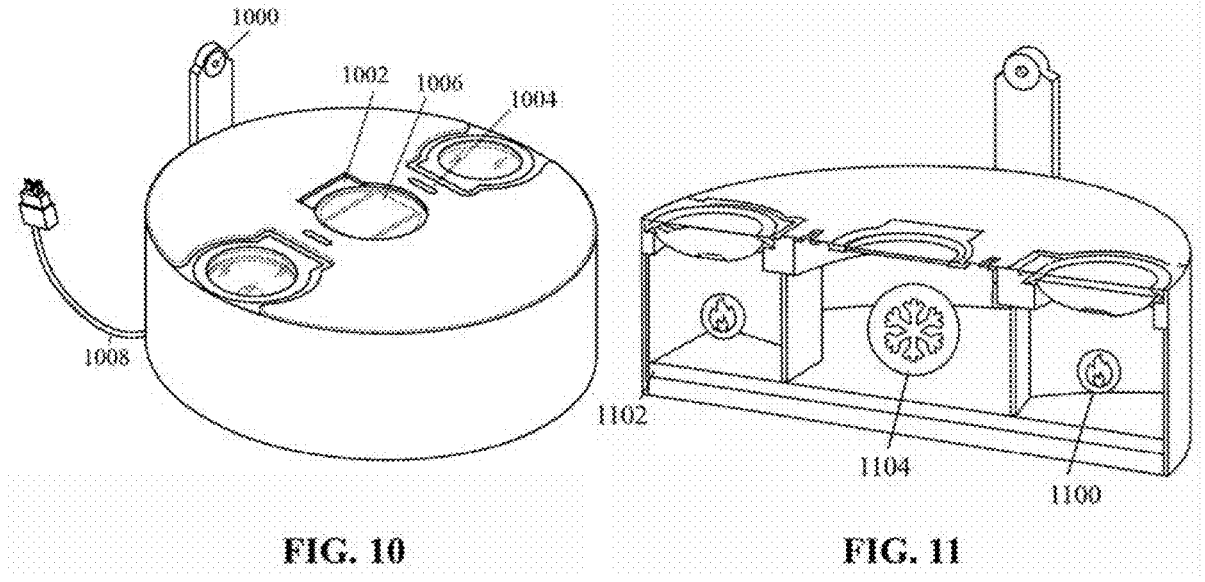
FIG. 10                              FIG. 11

TEMPERATURE-CONTROLLED AUTOMATIC WET PET FOOD FEEDER ASSEMBLY

FIELD OF THE INVENTION

The present invention relates to pet accessories and, more specifically, a temperature-controlled, automatic, and portable wet pet food feeder assembly that stores and dispenses wet food to pets on a schedule and at a desired temperature.

BACKGROUND OF THE INVENTION

Many users desire to feed their pets with wet food in a safe, effective, and efficient manner. While existing dry pet food feeder assemblies are operably configured to store and dispense dry pet food in an efficient manner, the same assemblies are ill-suited to store or dispense wet or canned pet food given the texture, consistency, and moisture in such foods, as well as the need for such foods to be maintained at a consistent and regulated temperature to prevent the food from spoiling.

There are some known references that are operably configured to move a tray at a programmed time, but these references are not operably configured to refrigerate and/or heat wet food and dispense said food in a reliable and effective manner. Specifically, Robinson et al., U.S. Pat. No. 4,671,210 is an automatic pet feeder that is adapted to provide food and water to an animal on a periodic or scheduled basis, but utilizes a motorize tray to move the dry pet food based on said scheduled. Williamson, U.S. Pat. No. 4,501,229 also discloses an automatic animal-feeding device adapted to be selectively controlled for dispensing measured amounts of food at pre-selected time intervals, but it is not equipped to be utilized with wet food and is prone to failure with many moving parts.

Lastly, Chen, U.S. Pat. No. 10,568,301 discloses a pet feeder that includes a casing having an opening, a tray unit housed in the casing having a number of trays, a refrigerating unit inside the casing enclosing the tray unit so that all trays except one tray exposed by the opening are covered. The pet feeder does include a temperature control unit housed in the casing and connected to the refrigerating unit and the one tray exposed by the opening, and a driving unit connected to the temperature control unit and driving the tray unit to spin. This unit, while controlling the temperature of the food in said pet feeder, the pet feeder also utilizes a complicated and costly assembly to effectuate the dispensing of the pet food. Further, said assembly does not efficiently sense or identify the pet for selective dispensing of the pet food.

Therefore, a need exists to overcome the problems with the prior art as discussed above.

SUMMARY OF THE INVENTION

To significantly reduce the time and effort associated with feeding pets their wet or canned food, the invention provides a feeder assembly that overcomes the heretofore-mentioned disadvantages of the heretofore-known devices of this general type and that provides a temperature-controlled, automatic, and portable wet pet food feeder assembly that stores and dispenses wet food to pets on a schedule that can be set.

With the foregoing and other objects in view, there is provided, in accordance with the invention, a temperature-controlled automatic wet pet food feeder assembly that includes a portable housing with a bottom wall, with a sidewall coupled to the bottom wall and defining two opposing side faces and a front face interposing the two opposing side faces, and defining an interior chamber enclosed by the sidewall. Further, the assembly includes a plurality of feeding compartments each with a compartment bottom wall, with a compartment sidewall coupled to the compartment bottom wall, defining a compartment cavity, with a compartment cover having a closed position with the compartment cover selectively removably coupled to the compartment sidewall in a hermetically sealed configuration with a cover motor and having an open position along a compartment cover translation path exposing and unsealing the compartment cavity, each having a thermocouple coupled thereto and configured to detect a compartment temperature within the compartment cavity, and each disposed within the interior chamber and oriented in a longitudinally aligned configuration with one another and with the compartment bottom wall facing the compartment cover. The assembly also includes an electronic control unit coupled to the portable housing and communicatively coupled the cover motor for each of the plurality of feeding compartments, a refrigeration unit communicatively coupled to the electronic control unit, coupled to the portable housing, and operably configured to individually and thermally modulate the plurality of feeding compartments to a desired cooled temperature within a range of 30-45° F. corresponding to the compartment temperature and when the compartment cover is placed in the closed position, and a heating unit communicatively coupled to the electronic control unit, coupled to the portable housing, and operably configured to individually and thermally modulate at least one of the plurality of feeding compartments to a desired heated temperature within a range of 70-90° F. and based a user-selected time schedule, the electronic control unit operably configured to cause the cover motor to selectively place the compartment cover of the at least one of the plurality of feeding compartments to the open position at the user-selected time schedule and when the compartment temperature reaches the desired heated temperature. The assembly also includes a weight scale communicatively coupled to the electronic control unit, operably coupled to the compartment bottom wall of the at least one of the plurality of feeding compartments, and configured to detect an actual weight of pet food disposable within the compartment cavity, wherein the electronic control unit is operably configured to cause the cover motor to move the compartment cover of the at least one of the plurality of feeding compartments from the open position to the closed position when the actual weight reaches a programmed weight.

In accordance with another feature, an embodiment of the present invention also includes a camera coupled to the portable housing, oriented toward the front face of the portable housing, and communicatively coupled to the electronic control unit, wherein the electronic control unit is programmed with pet recognition software configured to identity at least one unique feature associated with a predetermined pet and operably configured to cause the cover motor to selectively place the compartment cover of the at least one of the plurality of feeding compartments in the open position at the user-selected time schedule, when the compartment temperature reaches the desired heated temperature, and when identifying the predetermined pet.

In accordance with yet another feature, an embodiment of the present invention also includes a hood assembly coupled to the portable housing on each of the two opposing side faces, displaced a height of at least 6 inches above, and covering, the compartment cover for each of the plurality of feeding compartments, and having the camera coupled thereto.

In accordance with an additional feature, an embodiment of the present invention also includes a hood assembly coupled to the portable housing, displaced a height of at least 6 inches above, and covering, the compartment cover for each of the plurality of feeding compartments, and having a chip sensor coupled thereto and communicatively coupled to the electronic control unit that is operably configured to cause the cover motor to selectively place the compartment cover of the at least one of the plurality of feeding compartments in the open position when detecting a registered chip signal from the chip sensor.

In accordance with an exemplary feature, an embodiment of the present invention also includes an electronic display coupled to the portable housing, communicatively coupled to the electronic control unit, and operably configured to receive the desired cooled temperature, the desired heated temperature, and the user-selected time schedule.

In accordance with another feature, an embodiment of the present invention also includes bottom wall of the portable housing having a friction-inducing non-skid surface disposed thereon. In accordance with an additional feature, an embodiment of the present invention also includes the portable housing having a top cover coupled to the sidewall of the portable housing, defining a plurality of enclosed compartment apertures shaped and sized to receive each of the plurality of feeding compartments, wherein the top cover is configured to retain each of the plurality of feeding compartments and the plurality of feeding compartments selectively removably coupled the portable housing.

In accordance with another feature, an embodiment of the present invention also includes an electronic timer communicatively coupled to the electronic control unit and configured to initiate when the at least one of the plurality of feeding compartments is placed in the open position, wherein the electronic control unit is operably configured to cause the cover motor to move the compartment cover of the at least one of the plurality of feeding compartments from the open position to the closed position when the actual weight reaches the programmed weight and after a feeding time period from initiation of the electronic timer.

In accordance with yet another feature, an embodiment of the present invention also includes an electronic display coupled to the portable housing, communicatively coupled to the electronic control unit, and operably configured to receive the desired cooled temperature, the desired heated temperature, the user-selected time schedule, and the feeding time period.

In accordance with a further feature of the present invention, the electronic control unit is communicatively coupled to computer readable instructions programmed to cause the compartment cover of the at least one of the plurality of feeding compartments moved from the open position to the closed position to remain in the closed position unless receiving active user reset selection.

In accordance with another feature, an embodiment of the present invention includes a plurality of LEDs coupled to the portable housing, each respectively associated with the plurality of feeding compartments, communicatively coupled to the electronic control unit, and operably configured to emit a plurality of colors, the electronic control unit operably configured to send a signal to one of the plurality of LEDs to emit a first color of the plurality of colors when the refrigeration unit is thermally modulating the plurality of feeding compartments to the desired cooled temperature and send another signal to the one of the plurality of LEDs to emit a second color of the plurality of colors when the heating unit is thermally modulating the at least one of the plurality of feeding compartments to the desired heated temperature.

In accordance with yet another feature, an embodiment of the present invention also includes a plurality of buttons each respectively coupled to the compartment cover of one of the plurality of feeding compartments and operably configured to selectively place the compartment cover in the open position.

In accordance with a further feature of the present invention, the electronic control unit is communicatively coupled to computer readable instructions programmed to prevent, unless receiving an active user reset selection, the compartment cover from being placed in the open position when, after the feeding compartments reach the desired cooled temperature, the compartment temperature exceeds the desired cooled temperature for a programmed period of time.

Although the invention is illustrated and described herein as embodied in a temperature-controlled automatic wet pet food feeder assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 10 depicts a perspective view of a temperature-controlled automatic wet pet food feeder assembly in accordance with one embodiment of the present invention;

FIG. 11 depicts a cross-sectional view of the temperature-controlled automatic wet pet food feeder assembly of FIG. 10;

DETAILED DESCRIPTION

Figure 1:
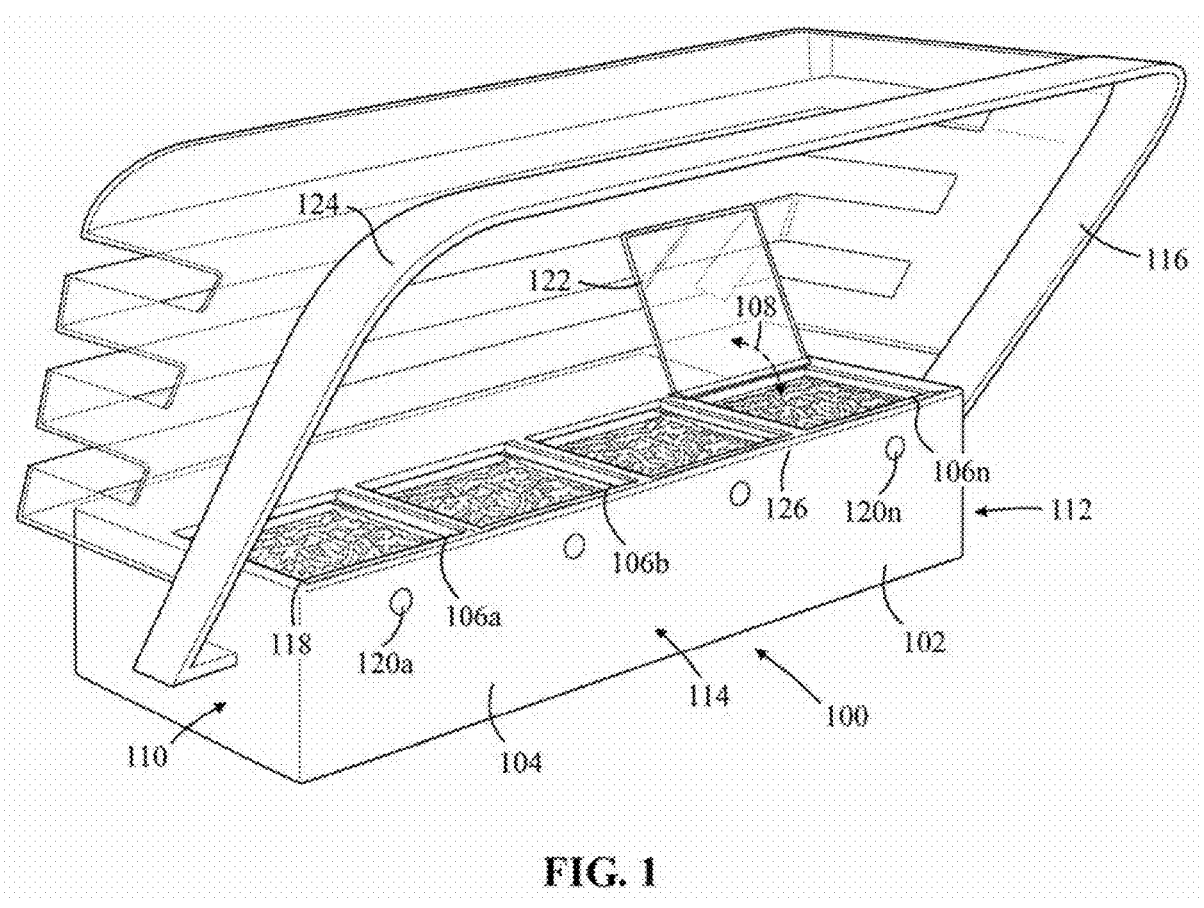
FIGS. 1-2 depict perspective views of a temperature-controlled automatic wet pet food feeder assembly in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Referring now to FIGS. 1-3, FIG. 6, and FIG. 8, the present invention provides a novel, programmable, temperature-controlled, automatic, and portable wet pet food feeder assembly 100 (herein referred to as "assembly 100" for brevity). The assembly 100 may include a housing 102 having a temperature-controlled interior chamber 800, a plurality of feeding compartments 106a-n (wherein "n" refers to any number greater than one) that may also be collectively or individually temperature controlled with a refrigeration or cooling unit 904, a scale 812, a touchscreen electronic display 902 (with screen 1500 and assembly 1502), and at least one heating unit 906. More specifically, the portable housing 102 includes a bottom wall 600, a sidewall 104 coupled to the bottom wall 600 (either integrally or using one or more fastener(s)), and defines two opposing side faces and a front face (depicted exemplary and rectangularly in FIGS. 1-2 with numerals 110, 112, and 114, respectively). The front face 114 and rear face 700 can be seen interposing the two opposing side faces 110, 112 and defining the interior chamber 800 enclosed by the sidewall 104.

Figure 8:
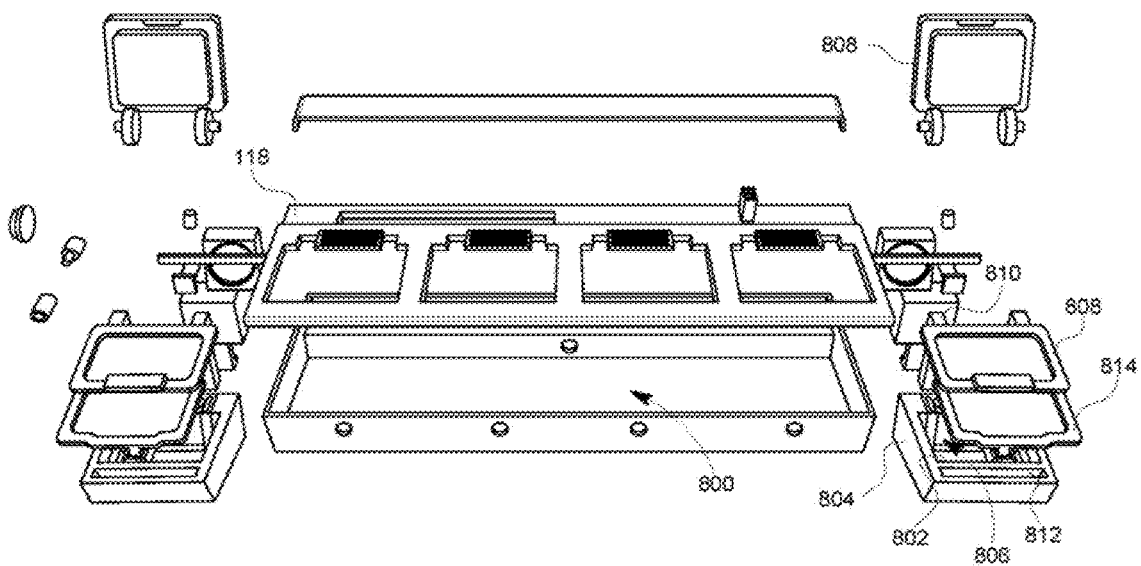
FIG. 8 depicts an exploded view of the temperature-controlled automatic wet pet food feeder assembly of FIG. 4.
Figure 12:
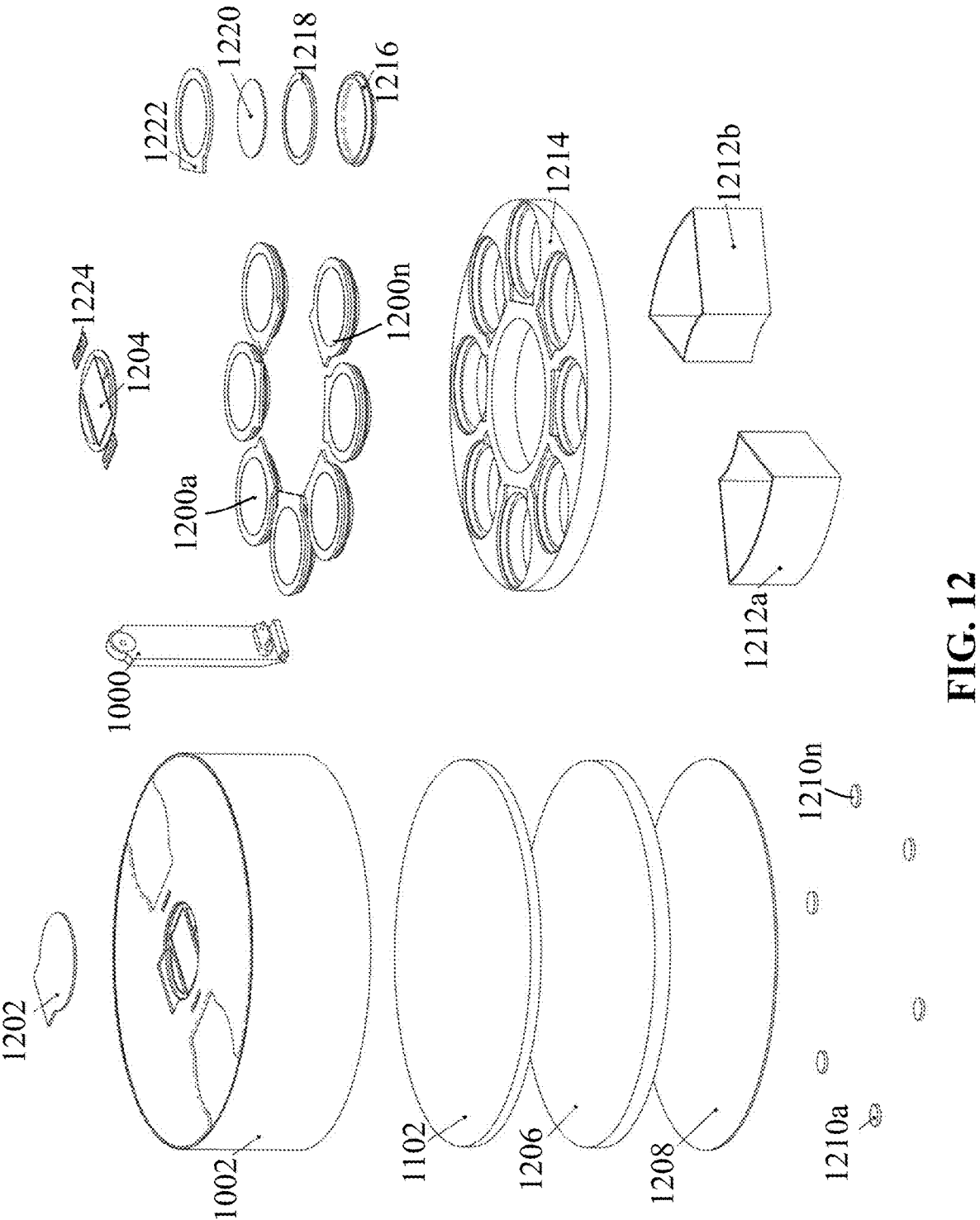
FIG. 12 depicts an exploded view of the temperature-controlled automatic wet pet food feeder assembly of FIG. 10.

In preferred embodiments, the housing 102 and other components depicted in FIG. 8 are of a substantially rigid, water-resistant, and dishwasher-safe material, e.g., a polymeric material such as acrylonitrile butadiene styrene ("ABS"), stainless steel, ceramic, aluminum, or another comparable material. The housing 102 is "portable", in that is sized and shaped to be transported by a female user of average weight and build (e.g., utilizing the statistics of the U.S. Centers of Disease Control and Prevention), less than approximately 25 lbs, or capable of being lifted without ancillary equipment. The housing 102 may be of a circular shape, a rectangular shape, or another shape, but is preferably and advantageously rectangular so the plurality of feeding compartments 106a-n can be disposed therein in a longitudinally aligned configuration (as exemplified in the figures). In some embodiments, the plurality of feeding compartments 106a-n are equally spaced from one another and parallel about a centroid of each of the plurality of feeding compartments 106a-n. The dimensions of the housing 102 may vary depending on the embodiment and the size of the pet being fed (e.g., larger dimensions for a pet of larger size). Exemplary dimensions of the rectangular embodiment depicted in FIGS. 1-8 and FIGS. 13-15 are a length of approximately 20 inches, a width of approximately 10 inches, and a height of approximately 6 inches. Exemplary dimensions of the circular embodiment depicted in FIGS. 10-12 are a diameter of approximately 18 inches and a height of approximately 6 inches.

The assembly 100 may be beneficially and selectively programmed by the user to feed a household pet (e.g., a cat, dog, bird, etc.) at scheduled and interval times. For wet food, feeding generally entails warming the food, opening a lid or cover 808 to expose the food, and closing the lid or cover 808 after a programmed amount of time. To that end, the plurality of feeding compartments 106a-n each have a compartment bottom wall 802, having a compartment sidewall 804 coupled to the compartment bottom wall 802 (integrally or coupled together), and define a compartment cavity 806 that is temperature controlled, i.e., cooled for storage or heated for feeding. The feeding compartments 106a-n may each include a selectively removable tray 814 for receiving and retaining the pet food and is preferably wide & shallow, e.g., 4 inches in width, 5 inches in length, and 2 inches in depth. The trays 814 and other parts of the plurality of feeding compartments 106a-n may of the same material as the housing 102.

Figures 13, 14:
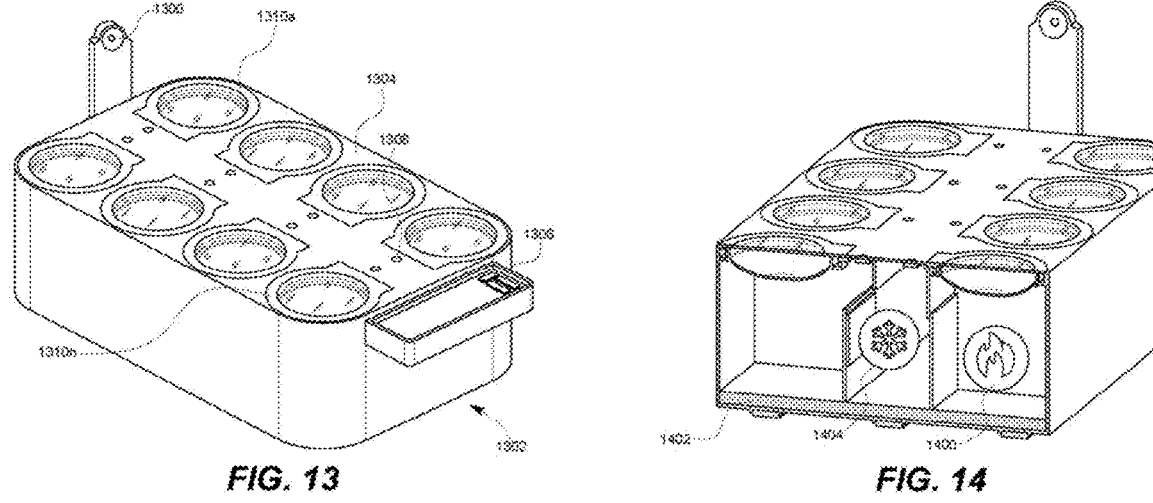
FIG. 13 depicts a perspective view of a temperature-controlled automatic wet pet food feeder assembly in accordance with one embodiment of the present invention.
FIG. 14 depicts a cross-sectional view of the temperature-controlled automatic wet pet food feeder assembly of FIG. 13.

Each of the plurality of feeding compartments 106a-n includes a compartment cover 808 having a closed position with the compartment cover 808 selectively removably coupled to the compartment sidewall in a hermetically sealed configuration with a cover motor 810 (exemplified in FIG. 13). To ensure the hermetically sealed configuration, the cover 808 or compartment 106 may include an elastomeric gasket 122, e.g., of a natural rubber and may lock with a fastener selectively movable by the user and coupled to the compartment 106. The compartment cover 808 also includes an open position (exemplified in FIG. 1) along a compartment cover translation path 108 exposing and unsealing the compartment cavity. In preferred embodiments, the open position includes the cover 808 removed a sufficient distance to permit the pet to access all areas of the tray 814. This may include the cover 808 rotated approximately 90° (+/−10°) relative to the compartment 106. The compartment cover translation path 108 may be circular and the cover 808 may be rotatably coupled to the compartment 106 with a hinge operably connected to a motor 810.

Each of the plurality of feeding compartments 106a-n include a thermocouple 910 (e.g., a sensor that measures temperature of an ambient area) coupled thereto, e.g., on an inside surface of the cover 808 and that is configured to detect a compartment temperature within the compartment cavity 806 (which may also include the space defined between the tray 814 and the cover 808. Each of the plurality of feeding compartments 106a-n are disposed within the interior chamber 800 and oriented in a longitudinally aligned configuration with one another and with the compartment bottom wall 802 facing the compartment cover 808 so the tray 814 can be accessed by the pet.

Figure 9:
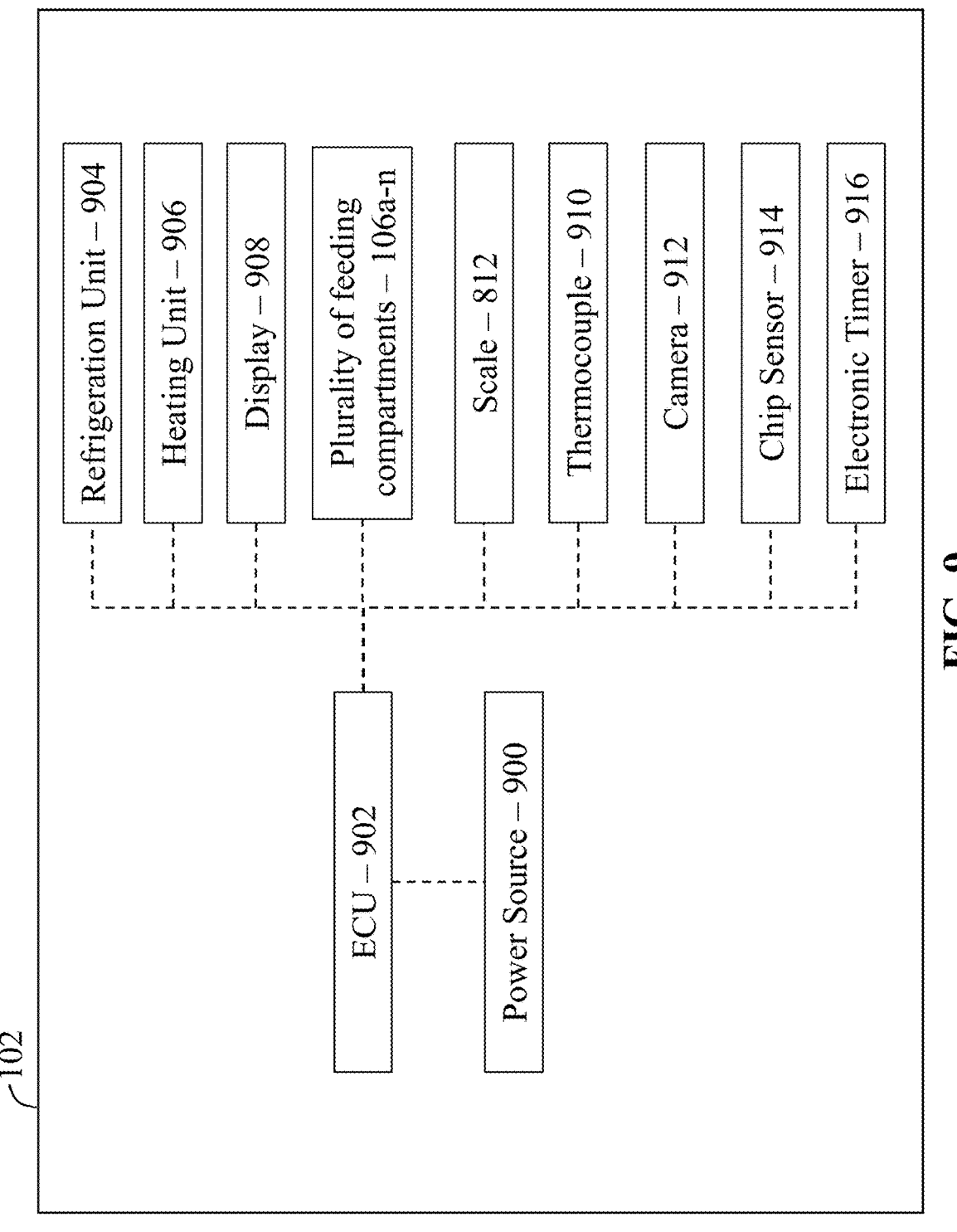
FIG. 9 depicts a block diagram depicting the connectivity (both communication and electrical) of the components utilized in the temperature-controlled automatic wet pet food feeder assembly in accordance with one embodiment of the present invention.

With reference to FIG. 1 and FIGS. 8-9, the assembly 100 also includes an electronic control unit (ECU) 902 coupled to the portable housing 102 and communicatively coupled the cover motor 810 for each of the plurality of feeding compartments 106a-n. The ECU 902 may be an embedded module on a chip or a standalone processor that is operable to control functionality of connected electrical/electro-mechanical components. As depicted in FIG. 9, the ECU 902 may be directly connected and operable to receive electricity from a power source 900 (e.g., 120 AC outlet connected with retractable cord attached to the assembly 100 or onboard battery), represented with dashed lines. The power source 900 may also provide direct or indirect power to other components within or coupled to the housing 102. The ECU 902 is communicatively coupled to other components in the assembly 100, represented with dashed lines. The ECU communication may be wireless (e.g., Bluetooth) or wired (e.g., using HDMI).

The refrigeration unit 904 is communicatively coupled to the electronic control unit 902, coupled to the portable housing 102, and operably configured to individually and thermally modulate the plurality of feeding compartments 106a-n, namely the compartment cavity where the pet food is to be stored, to a desired cooled temperature within a range of 30-45° F., wherein the range of 35-40° F. is preferred. The cooling or thermal modulation corresponds to the compartment temperature so the ECU 904 activates and shuts off the refrigeration unit 904 for the necessary period of time. The refrigeration is done when the compartment cover 808 is placed in the closed position and possibly for a short period of time while the cover 808 is in the open position for pet feeding. The refrigeration unit may include a compressor, a condenser, an expansion device, and an evaporator. The refrigeration unit 904 may also be considered a "cooling" unit, i.e., it could include a thermoelectric cooling assembly that includes passing an electrical current through two dissimilar conductors. To that end, the assembly may utilize a fan and other structural components required to effectuate the thermoelectric cooling of the container cavity 806. Similarly, the cycle may be reversed to heat an individual feeding compartment 106.

To that end, the heating unit 906 is also communicatively coupled to the electronic control unit 902, coupled to the portable housing 102, and operably configured to individually and thermally modulate at least one of the plurality of feeding compartments 106a-n to a desired heated temperature within a range of 65-80° F. (preferably approximately 70° F.), room temperature, or another desired heating temperature. The assembly 100 may utilize a single refrigeration unit 904 and a single heating unit 906 to modulate the temperature in each of the plurality of feeding compartments 106a-n. In other embodiments, each of the plurality of feeding compartments 106a-n may have their own refrigeration unit 904 and heating unit 906. The heating unit 906 may utilize one or more heating element(s) controlled by the ECU 902 that generate heat transferred through conduction to each compartment cavity 806. Beneficially, the tray 814, which is designed to sit on a flange of the feeding compartment may be of a thermally conductive material, e.g., stainless steel, aluminum, ceramic, or other similar material.

The heating by the heating unit 906 is beneficially dictated and based on a user-selected time schedule. In some embodiments, each compartment may store multiple servings of food, thereby requiring heating on two separate time intervals. The electronic control unit 902 is operably configured to cause a cover motor 810 to selectively place the compartment cover 808 of the at least one of the plurality of feeding compartments 106a-n to the open position at the user-selected time schedule and when the compartment temperature reaches the desired heated temperature. The cover motor 810 may be a 6-12V DC motor capable of generating 60-180 oz-in of torque and may be operably connected to one or more gears coupled to the compartment cover 808 (as exemplified in FIG. 8).

The temperature controlled assembly maintains stored wet pet food at approximately 35-40° F. and selectively heats one or more trays 814 to the desired heating temperature. Beneficially, the food is placed within the plurality of feeding compartments 106a-n and stored until ready to be served and, because of the longitudinally aligned compartments, the assembly 100 may feed multiple pets at the same time or pets for a longer period of time and in an effective manner. For example, the assembly may default to cooling any feeding compartments 106a-n and opening one (or more) compartments 106a-n every 30 minutes, sequentially, for a period of 5 minutes (i.e., the cover 808 is in the open position for 5 mins). The assembly 100 may be programmed (e.g., on the assembly itself through the electronic display 910 or through a software application communicatively coupled to the ECU 902 through a network interface) to another time interval or feeding schedule, e.g., 8 am and 6 pm every day until the food is gone.

To that end, the assembly 100 may utilize a weight scale 812 (e.g., weight sensor) communicatively coupled to the electronic control unit 904 and operably coupled to the compartment bottom wall 802 of the at least one of the plurality of feeding compartments 106a-n, e.g., by being placed underneath (adjacent or otherwise) the compartment wall, the bottom wall of the tray, or one a side surface capable of detecting weight of the pet food in the compartment 106. The scale 812 is configured to detect an actual weight of pet food disposable within the compartment cavity 806, e.g., within the tray 814. In one embodiment, the electronic control unit 902 is operably configured to cause the cover motor 810 to move the compartment cover 808 of the at least one of the plurality of feeding compartments 106a-n from the open position to the closed position when the actual weight reaches a programmed weight. Said another way and by way example, once a pet finishes eating the pet food, the weight of the tray 814 will be reduced from its initial weight before the cover 808 is opened. The ECU 902 may periodically receive weight data from the scale and, if no presence is detected in or near (e.g., within 2 feet) any of the feeding compartments 106, the ECU 902 will cause the cover 808 to be placed in the closed position. The presence of a pet may be detected with camera 912 (also depicted in FIG. 10 with numeral 1000 or in FIG. 13 with numeral 1300), a heat sensor, a noise sensor, and/or the like.

More specifically, the camera is coupled to the portable housing 102, is oriented toward the front face 114 of the portable housing 102, and is communicatively coupled to the electronic control unit 904. The electronic control unit 904 is programmed with pet recognition software configured to identify at least one unique feature associated with a predetermined pet, i.e., manually by the user or automatically using software. For example, one or more of the techniques described in McVey, U.S. Pat. No. 9,104,906 or Brown, U.S. Pat. No. 11,134,221, the contents of which are incorporated herein by reference, may be utilized to identify the one or more unique features of the user's pet(s). In further embodiments, the pet recognition software may use the pet's facial features, body type, color, etc. to recognize the user's pet. Additionally, the pet recognition software may be utilized with artificial intelligence that may store data associated with positive pet identifications and learn to modify the parameters associated with a positive pet identification. The ECU 902 is operably configured to cause the cover motor 810 to selectively place the compartment cover 808 of the at least one of the plurality of feeding compartments 106a-n in the open position at the user-selected time schedule, when the compartment temperature reaches the desired heated temperature, and when identifying the predetermined pet. For example, the user may want to prevent certain animals from accessing the food. To effectuate the same, the camera and identification software may be utilized. Alternatively, the user will have the option to attach a microchip reader or sensor 914 to the assembly 100 to detect an implanted microchip or a microchip attached to the animal, e.g., using an RFID protocol.

Figure 2:
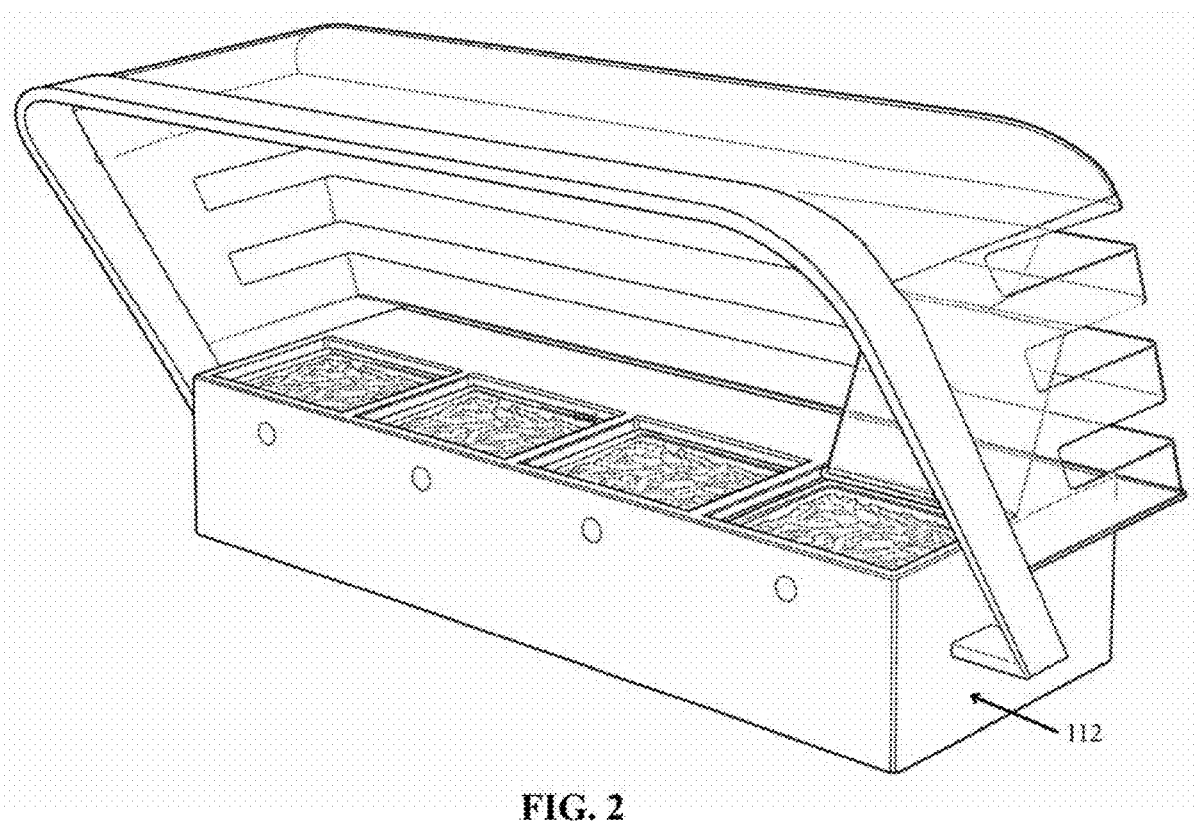
Figure 3:
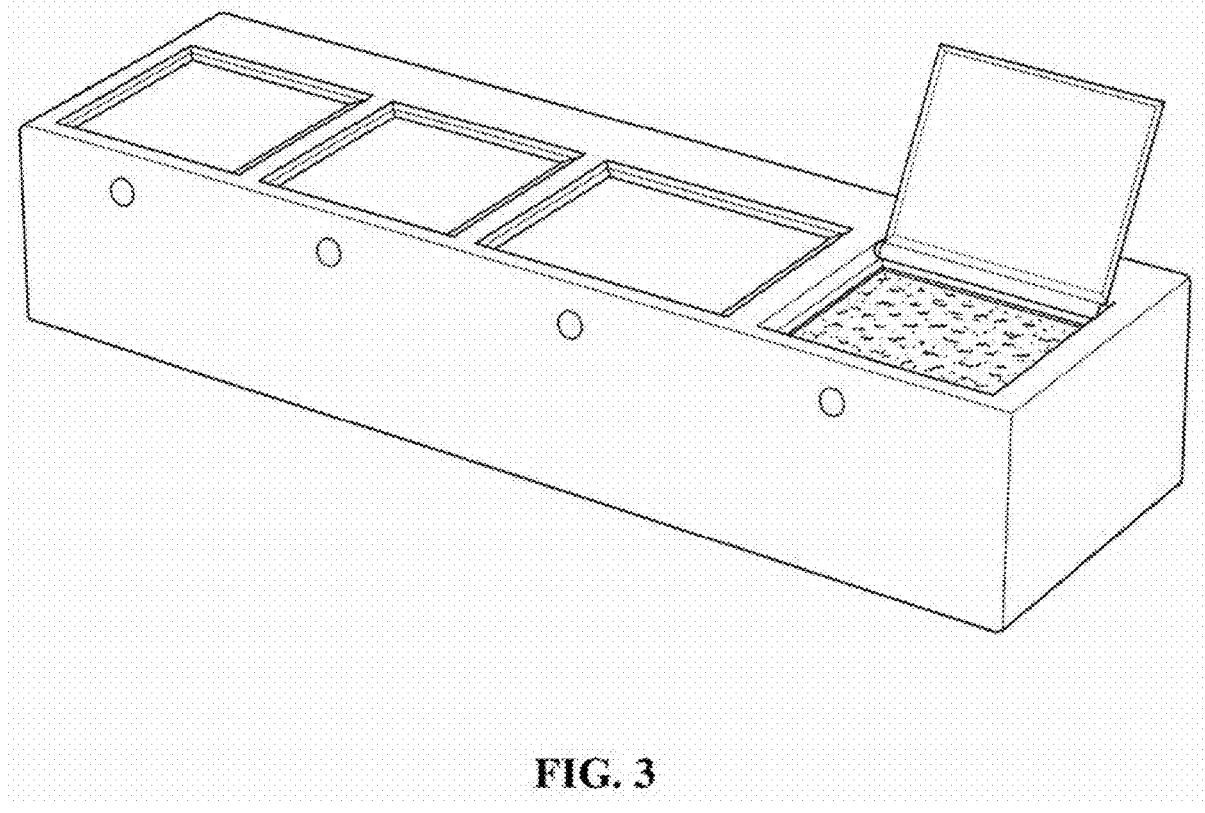
FIG. 3 depicts a perspective view of a temperature-controlled automatic wet pet food feeder assembly without a hood assembly in accordance with one embodiment of the present invention.
Figures 4, 5:
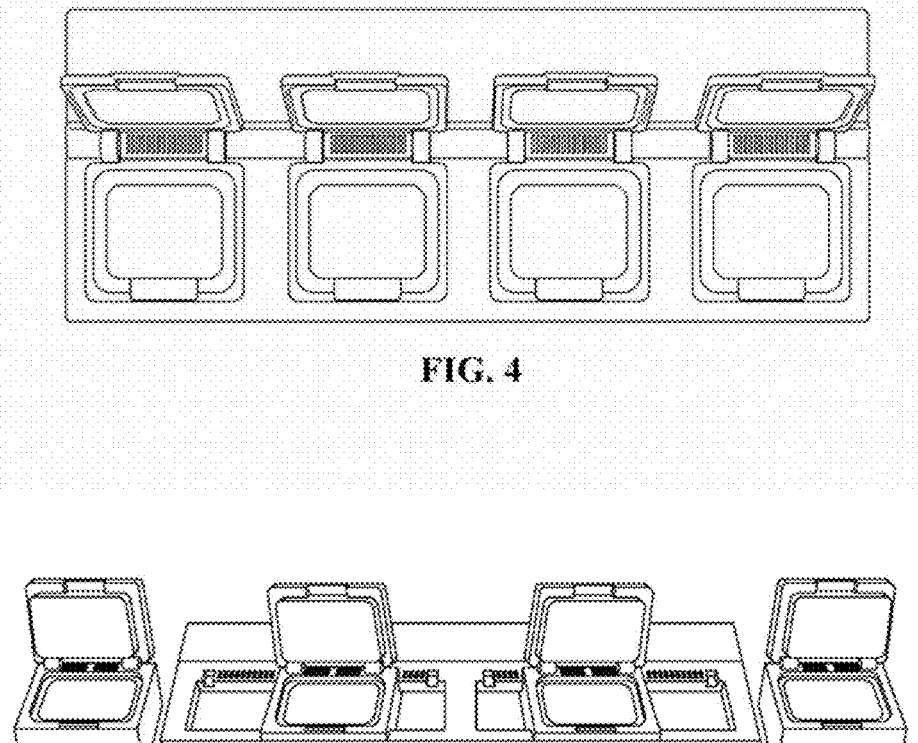
FIG. 4 depicts a top plan view of a temperature-controlled automatic wet pet food feeder assembly with the covers or lids of the plurality of feeding compartments in an open position in accordance with one embodiment of the present invention.
FIG. 5 depicts a perspective view of the temperature-controlled automatic wet pet food feeder assembly of FIG. 4 the plurality of feeding compartments selectively removed from the portable housing in accordance with one embodiment of the present invention.
Figures 6, 7:
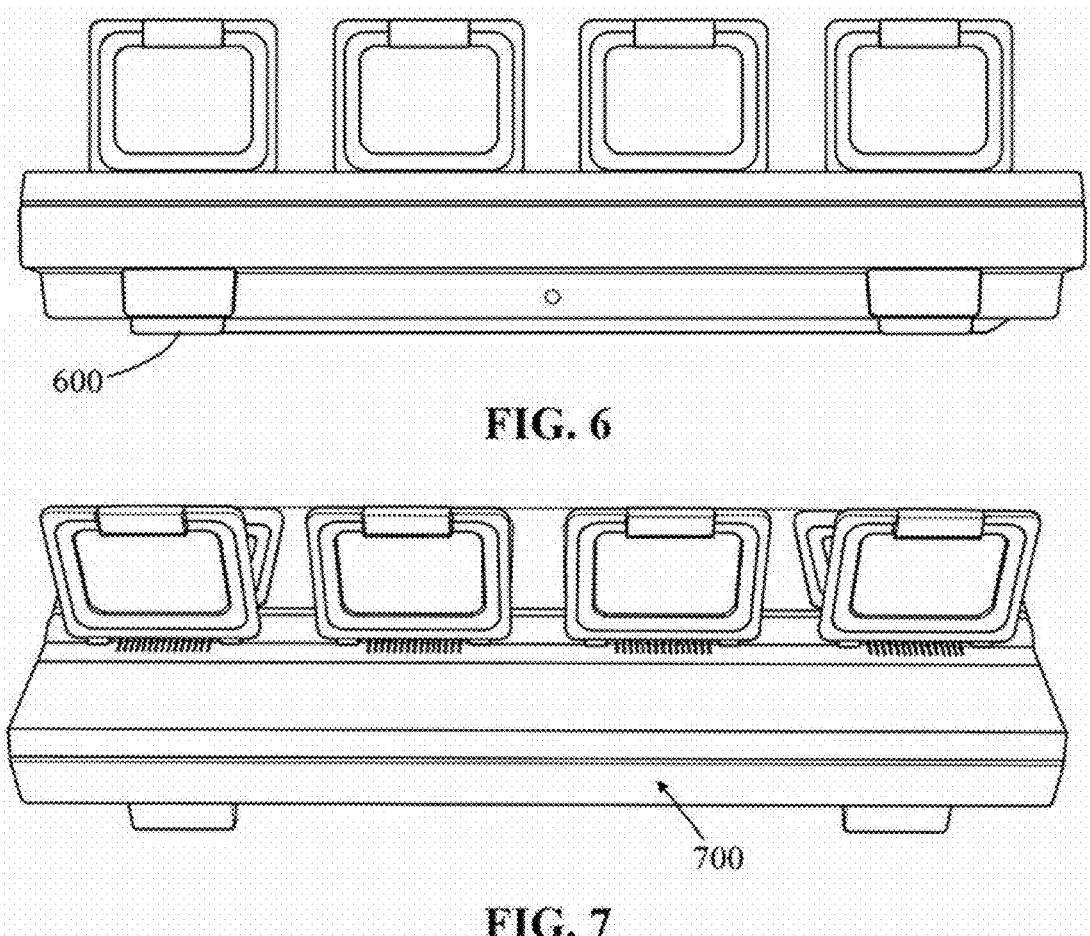
FIGS. 6-7 depict perspective rear views of the temperature-controlled automatic wet pet food feeder assembly of FIG. 4.

With reference to FIGS. 1-2 and FIG. 8, the assembly 100 may include a hood assembly 116 coupled to the portable housing 102 on each of the two opposing side faces 110, 112. In one embodiment, the hood assembly 116 may be selectively couplable to the sides with one or more fastener(s) and is displaced a height of at least 6 inches above, and covering, the compartment cover 808 for each of the plurality of feeding compartments 106a-n. The hood assembly 116 may have the camera coupled to the front rim 124 thereof. The hood assembly 116 may protrude past a front edge 126 of the front face 114 (approximately 1-6 inches) and may extend downwardly and rearwardly in a planar orientation such that each of the feeding compartments 106a-n are not obstructed. The rear wall of the hood assembly 116 may include a plurality of tightly spaced slats (approximately 1-2 inches in width) for ventilation. The hood assembly 116 may also include the chip sensor 914 coupled thereto and communicatively coupled to the electronic control unit 904, wherein the chip sensor 914 is operably configured to cause the cover motor 810 to selectively place the compartment cover 808 of the at least one of the plurality of feeding compartments 106a-n in the open position when detecting a registered chip signal from the chip sensor 914.

In one embodiment, the assembly 100 includes an electronic display 908 coupled to the portable housing 102, that is communicatively coupled to the electronic control unit 904, and is operably configured to receive the desired cooled temperature, the desired heated temperature, and the user-selected time schedule. The electronic display may also depict the compartment temperature and have the ability to permit the user to enter the feeding schedule, with "note", the "pet name", etc. The electronic display or a separate button may enable the user to override the schedule, feed a pet at any time, or enter an active user reset selection. In one exemplary embodiment, the electronic display 908 includes a liquid-crystal display (LCD) for inputting a customized and tailored feeding schedule. The touchscreen display 104 may also comprise a battery backup to remember the selected schedule in the event of a power disruption, such as an outage. There may also be an indicator if temperature rises to a determined level during power disruption, indicating possible food spoilage. An audible tone or sound may play when food is served. In accordance with a further feature, the assembly 100 may have the ability to record a customized sound to play.

In one embodiment, a plurality of LEDs are coupled to the portable housing 102, each respectively associated with the plurality of feeding compartments 106a-n (e.g., at or near each of the feeding compartments 106a-n or within 1-4 inches from each of the respective plurality of feeding compartments. The plurality of LEDs are communicatively coupled to the electronic control unit 902 and operably configured to emit a plurality of colors. To that end, the electronic control unit 902 is operably configured to send a signal to one of the plurality of LEDs to emit a first color (e.g., blue) of the plurality of colors when the refrigeration unit 904 is thermally modulating the plurality of feeding compartments 106a-n to the desired cooled temperature and send another signal to the one of the plurality of LEDs to emit a second color (e.g., red) of the plurality of colors when the heating unit 906 is thermally modulating the at least one of the plurality of feeding compartments 106a-n to the desired heated temperature. The light or LEDs may be formed annually around a button (as depicted in FIG. 1) to show the status of the food, e.g., ready to serve, already served, or no food available. Each of the plurality of buttons 120a-n may be coupled to the compartment cover 808 of one of the plurality of feeding compartments 106a-n and each operably configured to selectively place the compartment cover 808 in the open position. Said another way, the buttons 120a-n enable the user to manually and selectively open the cover(s) 808 coupled thereto; alternatively, the cover 808 may be coupled to a latch that is selectively moved with a motor or other lever controlled by the ECU 902.

In one embodiment, the bottom wall 600 of the portable housing 102 also includes a friction-inducing non-skid surface (e.g., natural rubber, EVA foam, and formed in strips) disposed thereon. The friction-inducing non-skid surface inhibits or prevents the assembly 100 from inadvertently moving or tilting. Furthermore, with specific reference to FIG. 1 and FIG. 8, the portable housing 102 may also include a top cover 118 coupled to the sidewall 104 of the portable housing 102, can be seen defining a plurality of enclosed compartment apertures shaped and sized to receive each of the plurality of feeding compartments 106a-n. The top cover 118 is configured to retain each of the plurality of feeding compartments 106a-n in the longitudinally oriented orientation and configuration and enable the plurality of feeding compartments 106a-n to be selectively removably coupled to the portable housing 102.

The assembly 100 may also include an electronic timer 916 communicatively coupled to the electronic control unit 904 and is configured (e.g., programmed) to initiate when the at least one of the plurality of feeding compartments 106a-n is placed in the open position. This enables a counter to ascertain how long a pet has fed, is feeding, and/or how long the compartment cavity is exposed. The electronic control unit 902 is operably configured to cause the cover motor 810 to move the compartment cover 808 of the at least one of the plurality of feeding compartments 106a-n from the open position to the closed position when the actual weight reaches the programmed weight and after a feeding time period from initiation of the electronic timer 916. The electronic display 908 may also be configured to receive the feeding time period.

In one embodiment, the electronic control unit 902 is communicatively coupled to computer readable instructions programmed to cause the compartment cover 808 of the at least one of the plurality of feeding compartments 106a-n moved from the open position to the closed position to remain in the closed position unless receiving active user reset selection. This safety protocol ensures any food served or exposed for too long, i.e., contaminated, will not be served again. The ECU 902 may also be configured to prevent covers 808 from opening if there is power loss or any other type of malfunction (e.g., if the assembly is not maintained in an upright orientation), or if the compartment temperature exceeds a particular threshold (e.g., 40° F.) for a particular period of time. Said differently, the electronic control unit 902 is also communicatively coupled to computer readable instructions programmed to prevent, unless receiving an active user reset selection, the compartment cover 808 from being placed in the open position when, after the feeding compartments 106a-n reach the desired cooled temperature, the compartment temperature exceeds the desired cooled temperature for a programmed period of time. As such, the assembly 100 will not serve food if the internal temperature goes above 40 degrees for a certain amount of time (after initial plug-in & cool down)). If there is a power loss, ECU 902 may remember programmed settings. Furthermore, the power source 900 may be a cord located in the rear face of the assembly 100 and will allow the feeder to plug into the wall or to connect to and be powered by another feeder creating a "daisy chain".

With reference to FIGS. 10-12, another embodiment of a temperature-controlled automatic wet pet food feeder assembly is depicted, wherein said assembly has many of the same features as the assembly 100. Specifically, the housing 1002 is cylindrical and a plurality of feeding compartments 1200a-n are operably configured to rotate into the warming/feeding position (depicted with numeral 1100) at the designated/scheduled time. In a preferred embodiment, the plurality of feeding compartments 1200a-n are of an aluminum composition to facilitate easier and more effective cooling, warming, storage, and clean-up. The scale 1102 is integrated into the bottom surface of the housing 1002 in one embodiment and is operably configured to monitor the food consumption. The center of the housing 1002 is cooled (depicted with numeral 1104), wherein a green LED 1004 may indicate when the compartment is heated to the desired heated temperature. A speaker 1006 may be utilized to make audible noises when the food is warmed and may also be programmed with the user's voice to call the pet to action. The cord 1008 may extend from the housing 1002 for connecting to an electrical outlet.

The housing 1002 may include screen cover 1202 for the electrical display 1204. A housing 1206 for the retractable power cord 1008 may also be utilized and be disposed beneath the scale 1102. The bottom wall 1208 will then couple the housing 1206 and scale 1102 to the housing 1002. One or more nonskid friction-inducting pad(s) 1210a-n may also be utilized and coupled to the bottom surface of the bottom wall 1208. A heating chamber housing 1212a-b may be utilized and disposed on opposite sides of the housing 1002, wherein the heating chamber housing 1212a-b may store the heating element(s), heating unit, etc. A tray 1214 may be formed with apertures shaped and sized to receive and retain the compartments 1200a-n and rotate about an axle concentrically coupled to the tray 1214. Each of the compartments may include a pet food bowl 1216, a gasket 1218, and a transparent window 1220 forming part of the cover rim 1222. The electronic display 1204 may also include a PCB board 1224.

Figure 15:
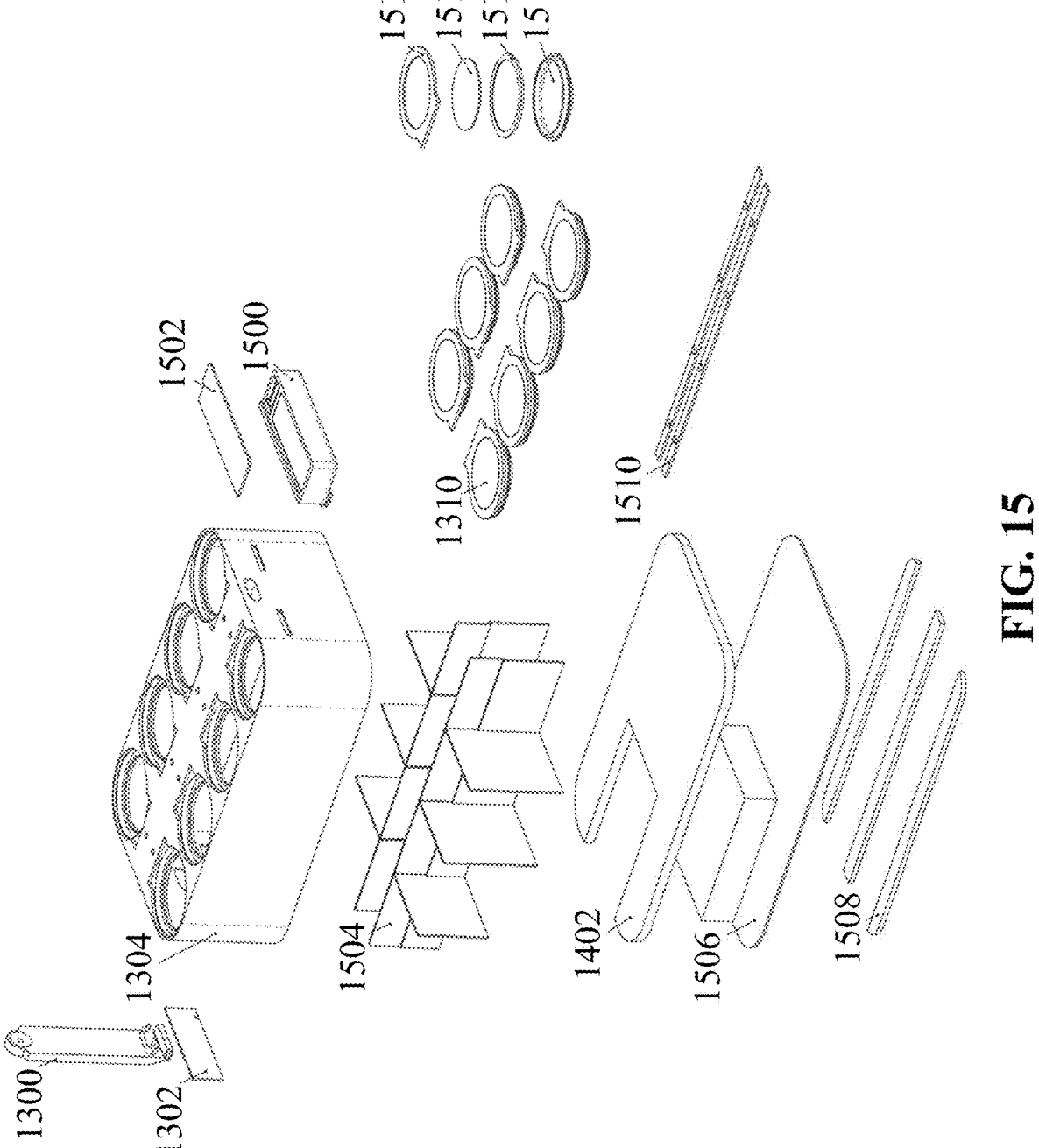
FIG. 15 depicts an exploded view of the temperature-controlled automatic wet pet food feeder assembly of FIG. 12.

With reference to FIGS. 13-15, another embodiment of a temperature-controlled automatic wet pet food feeder assembly 1302 is depicted, wherein said assembly 1302 has many of the same features as the assembly 100. Specifically, the electronic display 1306 can be seen on the housing 1304 and indicator(s) 1308 for visually showing the status of the food. Similarly, the housing 1304 includes a plurality of feeding compartments 1310a-n configured to be warmed to a feeding heated temperature (depicted with numeral 1400) at the designated/scheduled time. The scale 1402 is integrated into the bottom surface of the housing 1304 in one embodiment and is operably configured to monitor the food consumption. The center of the housing 1304 and other compartments are cooled (depicted with numeral 1404).

The camera 1300 may include connector plate 1504 for connecting with the housing 1304. Each of the compartments 1310a-n may be insulated (like the compartments 106a-n for the assembly 100) and include a divider assembly of a substantially rigid polymeric material. The scale 1402 is implemented under the divider assembly and coupled to the bottom wall 1506 that may be coupled to the nonslip friction-inducing strips 1508. The LEDs may be coupled to a strip 1510 for coupling to the housing 1304. Each of the compartments 1310 may also include a bowl 1512 with a gasket 1514 and a cover 1512 with a transparent window coupled thereto.

Although a specific order of executing the process steps has been disclosed and depicted, the order of executing the steps may be changed relative to the order shown in certain embodiments. Also, two or more steps described or shown as occurring in succession may be executed concurrently or with partial concurrence in some embodiments. Certain steps may also be omitted for the sake of brevity. In some embodiments, some or all of the process steps can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A temperature-controlled automatic wet pet food feeder assembly comprising:

a portable housing with a bottom wall, with a sidewall coupled to the bottom wall and defining two opposing side faces and a front face interposing the two opposing side faces, and defining an interior chamber enclosed by the sidewall;

a plurality of feeding compartments each with a compartment bottom wall, with a compartment sidewall coupled to the compartment bottom wall, defining a compartment cavity, with a compartment cover having a closed position with the compartment cover selectively removably coupled to the compartment sidewall in a hermetically sealed configuration with a cover motor and having an open position along a compartment cover translation path exposing and unsealing the compartment cavity, each having a thermocouple coupled thereto and configured to detect a compartment temperature within the compartment cavity, and each disposed within the interior chamber and oriented in a longitudinally aligned configuration with one another and with the compartment bottom wall facing the compartment cover;

an electronic control unit coupled to the portable housing and communicatively coupled the cover motor for each of the plurality of feeding compartments;

a refrigeration unit communicatively coupled to the electronic control unit, coupled to the portable housing, and operably configured to individually and thermally modulate the plurality of feeding compartments to a desired cooled temperature within a range of 30-45° F. corresponding to the compartment temperature and when the compartment cover is placed in the closed position;

a heating unit communicatively coupled to the electronic control unit, coupled to the portable housing, and operably configured to individually and thermally modulate at least one of the plurality of feeding compartments to a desired heated temperature within a range of 70-90° F. and based on a user-selected time schedule, the electronic control unit operably configured to cause the cover motor to selectively place the compartment cover of the at least one of the plurality of feeding compartments to the open position at the user-selected time schedule and when the compartment temperature reaches the desired heated temperature; and a weight scale communicatively coupled to the electronic control unit, operably coupled to the compartment bottom wall of the at least one of the plurality of feeding compartments, and configured to detect an actual weight of pet food disposable within the compartment cavity, the electronic control unit operably configured to cause the cover motor to move the compartment cover of the at least one of the plurality of feeding compartments from the open position to the closed position when the actual weight reaches a programmed weight.

2. The temperature-controlled automatic wet pet food feeder assembly according to claim 1, further comprising:

a camera coupled to the portable housing, oriented toward the front face of the portable housing, and communicatively coupled to the electronic control unit, the electronic control unit programmed with pet recognition software configured to identity at least one unique feature associated with a predetermined pet and operably configured to cause the cover motor to selectively place the compartment cover of the at least one of the plurality of feeding compartments in the open position at the user-selected time schedule, when the compartment temperature reaches the desired heated temperature, and when identifying the predetermined pet.

3. The temperature-controlled automatic wet pet food feeder assembly according to claim 2, further comprising:

a hood assembly coupled to the portable housing on each of the two opposing side faces, displaced a height of at least 6 inches above, and covering, the compartment cover for each of the plurality of feeding compartments, and having the camera coupled thereto.

4. The temperature-controlled automatic wet pet food feeder assembly according to claim 1, further comprising:

a hood assembly coupled to the portable housing, displaced a height of at least 6 inches above, and covering, the compartment cover for each of the plurality of feeding compartments, and having a chip sensor coupled thereto and communicatively coupled to the electronic control unit that is operably configured to cause the cover motor to selectively place the compartment cover of the at least one of the plurality of feeding compartments in the open position when detecting a registered chip signal from the chip sensor.

5. The temperature-controlled automatic wet pet food feeder assembly according to claim 1, further comprising:

an electronic display coupled to the portable housing, communicatively coupled to the electronic control unit, and operably configured to receive the desired cooled temperature, the desired heated temperature, and the user-selected time schedule.

6. The temperature-controlled automatic wet pet food feeder assembly according to claim 1, wherein the bottom wall of the portable housing further comprises:

a friction-inducing non-skid surface disposed thereon.

7. The temperature-controlled automatic wet pet food feeder assembly according to claim 1, wherein the portable housing further comprising:

a top cover coupled to the sidewall of the portable housing, defining a plurality of enclosed compartment apertures shaped and sized to receive each of the plurality of feeding compartments, the top cover configured to retain each of the plurality of feeding compartments and the plurality of feeding compartments selectively removably coupled the portable housing.

8. The temperature-controlled automatic wet pet food feeder assembly according to claim 1, further comprising:

an electronic timer communicatively coupled to the electronic control unit and configured to initiate when the at least one of the plurality of feeding compartments is placed in the open position, the electronic control unit operably configured to cause the cover motor to move the compartment cover of the at least one of the plurality of feeding compartments from the open position to the closed position when the actual weight reaches the programmed weight and after a feeding time period from initiation of the electronic timer.

9. The temperature-controlled automatic wet pet food feeder assembly according to claim 8, further comprising:

an electronic display coupled to the portable housing, communicatively coupled to the electronic control unit, and operably configured to receive the desired cooled temperature, the desired heated temperature, the user-selected time schedule, and the feeding time period.

10. The temperature-controlled automatic wet pet food feeder assembly according to claim 1, wherein the electronic control unit is communicatively coupled to computer readable instructions programmed to cause the compartment cover of the at least one of the plurality of feeding compartments moved from the open position to the closed position to remain in the closed position unless receiving active user reset selection.

11. The temperature-controlled automatic wet pet food feeder assembly according to claim 1, further comprising:

a plurality of LEDs coupled to the portable housing, each respectively associated with the plurality of feeding compartments, communicatively coupled to the electronic control unit, and operably configured to emit a plurality of colors, the electronic control unit operably configured to send a signal to one of the plurality of LEDs to emit a first color of the plurality of colors when the refrigeration unit is thermally modulating the plurality of feeding compartments to the desired cooled temperature and send another signal to the one of the plurality of LEDs to emit a second color of the plurality of colors when the heating unit is thermally modulating the at least one of the plurality of feeding compartments to the desired heated temperature.

12. The temperature-controlled automatic wet pet food feeder assembly according to claim 1, further comprising:

a plurality of buttons each respectively coupled to the compartment cover of one of the plurality of feeding compartments and operably configured to selectively place the compartment cover in the open position.

13. The temperature-controlled automatic wet pet food feeder assembly according to claim 1, wherein the electronic control unit is communicatively coupled to computer readable instructions programmed to prevent, unless receiving an active user reset selection, the compartment cover from being placed in the open position when, after the feeding compartments reach the desired cooled temperature, the compartment temperature exceeds the desired cooled temperature for a programmed period of time.

* * * * *